United States Patent
Chiou

(10) Patent No.: US 7,239,633 B1
(45) Date of Patent: Jul. 3, 2007

(54) ETHERNET SWITCH AND METHOD OF SWITCHING

(75) Inventor: Bin Chi Chiou, Miaoli Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/473,558

(22) Filed: Dec. 29, 1999

(51) Int. Cl.
*H04L 12/50* (2006.01)
*H04L 12/56* (2006.01)

(52) U.S. Cl. .................. 370/392; 370/310; 370/328; 370/338; 370/352; 370/389; 370/400; 370/401; 370/402

(58) Field of Classification Search ........ 370/229–232, 370/235, 237, 238, 241, 242, 244, 245, 357, 370/360, 363, 387, 392, 394, 400, 401, 407, 370/255, 254, 412, 415, 351, 389, 346
See application file for complete search history.

(56) References Cited

U.S. PATENT DOCUMENTS

| | | | | |
|---|---|---|---|---|
| 5,274,631 A | * | 12/1993 | Bhardwaj | 370/401 |
| 5,784,373 A | * | 7/1998 | Satake et al. | 370/402 |
| 5,970,232 A | * | 10/1999 | Passint et al. | 709/238 |
| 6,147,993 A | * | 11/2000 | Kloth et al. | 370/392 |
| 6,421,731 B1 | * | 7/2002 | Ciotti et al. | 709/238 |
| 6,545,982 B1 | * | 4/2003 | Murthy et al. | 370/245 |
| 6,600,724 B1 | * | 7/2003 | Cheng | 370/256 |

\* cited by examiner

*Primary Examiner*—Chi Pham
*Assistant Examiner*—Raj K. Jain
(74) *Attorney, Agent, or Firm*—Birch, Stewart, Kolasch & Birch, LLP

(57) ABSTRACT

An Ethernet switch and a method of switch for selectively transporting or filtering network packets. Said Ethernet switch comprises plural network ports, a first and a second memory device, a first and a second memory control device, a switch device, and a memory management device. Network ports are for receiving or delivering network packets. The first memory device saves the source address and associated messages of the network packets. The second memory device saves the network packets received from the network port. The first and the second memory control devices control the read and write of the first and the second memory devices. Further, the switch device creates a source address and the associated messages of the network port for each network packet, and a destination address and the associated messages of the network port for each network packet in accordance with the contents of the first memory device.

14 Claims, 9 Drawing Sheets

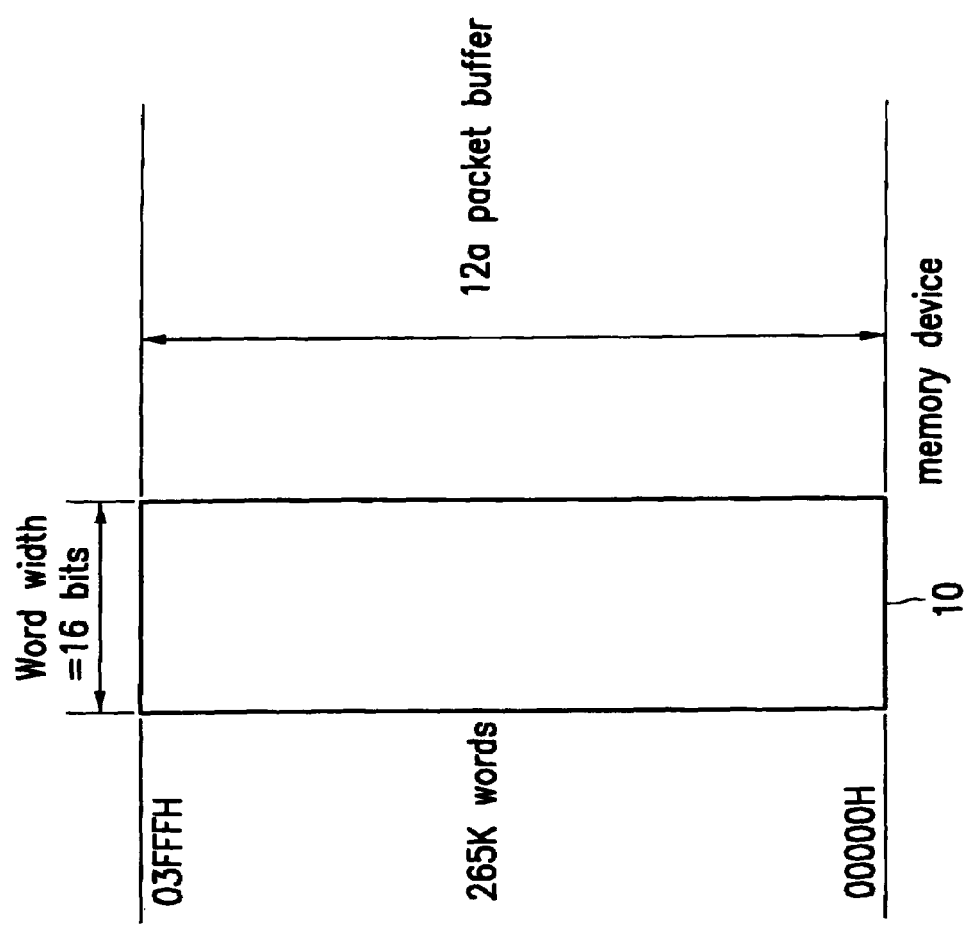

| Index | memory address | B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|---|---|
| 0000H | 0000H | address flag | data port no. | age flag | | | | | | | | ID pattern | | | | | |
| | 0001H | | | | | | | manufacturer ID () | | | | | | | | | |
| | 0002H | age index | | | | | | | | manufacturer ID (II) | | | | | | | |
| | 0003H | reserved | | | | | | | | | | | | | | | |
| 0001H | 0004H | address flag | data port no. | age flag | | | | | | | | ID pattern | | | | | |
| | 0005H | | | | | | | manufacturer ID () | | | | | | | | | |
| | 0006H | age index | | | | | | | | manufacturer ID (II) | | | | | | | |
| | 0007H | reserved | | | | | | | | | | | | | | | |
| 0002H | 0008H | address flag | data port no. | age flag | | | | | | | | ID pattern | | | | | |
| | 0009H | | | | | | | manufacturer ID () | | | | | | | | | |
| | 000aH | age index | | | | | | | | manufacturer ID (II) | | | | | | | |
| | 000bH | reserved | | | | | | | | | | | | | | | |
| 0003H | 000cH | address flag | data port no. | age flag | | | | | | | | ID pattern | | | | | |
| | 000dH | | | | | | | manufacturer ID () | | | | | | | | | |
| | 000eH | age index | | | | | | | | manufacturer ID (II) | | | | | | | |
| | 000fH | reserved | | | | | | | | | | | | | | | |
| 0004H | 0010H | address flag | data port no. | age flag | | | | | | | | ID pattern | | | | | |
| | 0011H | | | | | | | manufacturer ID () | | | | | | | | | |
| | 0012H | age index | | | | | | | | manufacturer ID (II) | | | | | | | |
| | 0013H | reserved | | | | | | | | | | | | | | | |

FIG. 4

ETHERNET SWITCH AND METHOD OF SWITCHING

BACKGROUND OF THE INVENTION

1. Field of the Invention

This invention relates to a network component, particularly to an Ethernet switch and its method of switching, for selectively transmitting data among several data ports or filtering network packets.

2. Description of the Prior Art

Ethernet is the most popular local area network (LAN) in digital communication market. Previously, the Ethernet framework is a 10BASE5 bus topology network. 10BASE2 is a lower cost improvement of 10BASE5. Although 10BASE2 and 10BASE5 belong to the same bus topology network and operate at the same 10 Mhz frequency, 10BASE2 uses a different type of coaxial cable, and its transmission distance is limited to 200 meters. Both 10BASE5 and 10BASE2 networks have the following drawbacks: costly installation, inflexible installation, and inability to use existing wiring system in the building, among others. 10BASE-T network has been proposed to make use of twisted cable to construct a star topology network for overcoming the drawbacks of 10BASE2 and 10BASE5 network.

When the scale of LAN grows larger and the load of digital transmission among LANs is also increases, the Ethernet performance degrades with the increasing number of nodes connected the LANs. Consequently, high speed Ethernet operating at high clock frequency is provided to address to the requirement for large-scale LANs or high speed digital terminals. High speed Ethernet operates at 100 MHz clock frequency to basically improve the performance of the 10BASE Ethernet. Moreover, high speed Ethernet also defines a media independent interface, for easy connection of said network nodes to twisted cable media or fiber optical media-based networks, such as 100BASE-TX, 100BASE-T4, or 100BASE-FX networks.

Basically, 10BASE5, 10BASE2, 10BASE-T, 100BASE-TX, 100BASE-T4 or 100BASE-FX belong to the shared network system. That is, the bandwidth of the entire network system is shared by all nodes in the interconnecting network system. The bandwidth for 10BASE network system is 10 MHz, and the bandwidth for 100BASE is 100 MHz. Consequently, when the number of nodes in the interconnecting network system exceeds a critical value, the performance of said network system becomes saturated. To overcome this problem, segmenting methodology is employed to segment the entire network system into several independent sub-networks and place each sub-network in a different collision domain. Therefore, nodes connecting to a different sub-network do not share the bandwidth of other sub-networks. For example, if a non-segmented shared 100BASE network system connects 100 nodes, then each node of the fully loaded network shares only 1 MHz bandwidth. In contrast, if said shared 100BASE LAN system is segmented into two segments, then each node of the fully loaded network shares 2 MHz bandwidth. The segmented LAN employing the Ethernet protocol is called a switching Ethernet. Transmitted packets in different segments are switched by the Ethernet switch. The main purpose of the Ethernet switch is to switch the packets to different segments of the LAN; therefore, packets from one segment are delivered to another segment, while packets from a node to another node in the same segment are not delivered.

Associated technology is disclosed in U.S. Pat. Nos. 5,274,631 and 5,491,694.

FIG. 1 is a block diagram illustrating the circuit of the discrete memory structure of the Ethernet switch.

As shown in FIG. 1, the Ethernet switch basically comprises of switch integrated circuit 100 and several port integrated circuits 110a, 110b, and 110c. The switch integrated circuit 100 controls the delivery and switch of network packets among ports. Port integrated circuits 110a, 110b, and 110c comprise internal memories 120a, 120b, and 120c for saving and switching network packets. Under this Ethernet framework, when a network packet is to be transmitted from port 130a to port 130b, the packet has to be first saved in the memory 120a, then transported from the memory 120a to the memory 120c. Therefore, the operating performance of this Ethernet switch is not promising. In addition, to enable the links of various LANs, such as 100BASE5, 10BASE2, 10BASE-T, 100BASE-TX, 100BASE-T4, or 100BASE-FX this type of Ethernet switch requires external memory, which is an additional cost.

SUMMARY OF THE INVENTION

Accordingly, the primary object of this invention is to provide a switch and method of switching for the Ethernet, for effectively delivering network packets to various segments.

Another object of this invention is to provide a switch and method of switching for the Ethernet, for linking a 10BASE network system to a 100BASE network system, wherein the existing network system smoothly expands to the new network system.

To realize the above and other objects, this invention provides an Ethernet switch for selectively transporting or filtering network packets. The Ethernet switch of this invention comprises plural network ports, a first and a second memory device, a first and a second memory control devices, an switch device, and a memory management device. Network ports are for receiving or delivering network packets. The first memory device saves the source address and associates messages of the network packets. The second memory device saves the network packets received from the network port. The first and the second memory control devices connect to the first and the second memory devices, respectively, for controlling the read and write of the first and the second memory devices. Further, the switch device connects the network port and the first memory control device, for creating a source address and the associated messages of the network port for each network packet, and for creating a destination address and the associated messages of the network port for each network packet in accordance with the contents of the first memory device for managing the contents of the first memory device. The second memory device connects the network port and the second memory control device for managing the contents of the second memory device.

Therefore, network packets may be delivered promptly and precisely to the LAN through the routing table initiation module, routing module, learning module and arbitration module. Also, the routing table aging module can reset aged indices periodically, so the indices of the routing table always maintains the most current update.

Moreover, data port can be made up of a media independent interface for linking LANs of various specifications. The indices of the routing table comprise source address, address flag, data port number, aging status, and aged level.

The route aging module can be made up of a countdown timer, its initial value determined by the predetermined life of each index of the routing table, for periodically deducting 1 from the aging index of all indices and resetting the indices with an indexing index less than 1, and for creating the indices for packets of other networks.

The learning module obtains several indices in accordance with the source address of the network packet and the selection mode of the address flag. When a network packet corresponds to one of the indices, the corresponding aging index of said index is set as the initial value. Conversely, when a network packet does not correspond to any index, the aging index with smaller index is then cleared to create a new index corresponding to said packet.

The routing module obtains several indices in accordance with the destination address of the network packet and the selection mode of the address flag. When a network packet corresponds to one of the indices, the data port corresponding to said index then transmits said network packet.

Furthermore, this invention also provides a method of switching network packets for the Ethernet switch, for selectively determining whether to transmit or filter said network packet. Said method comprises the following steps; provide a routing table comprising plural indices, for recording the source address of each packet and the messages associated with said packets. Next, provide a route learning device, for responding to the source address of each packet and the contents of the routing table, and for creating a new index of the routing table or updating an index of the routing table. Further, provide a routing device, for determining the relationship between the destination of each packet and the network port.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 illustrates the usage allocation of the memory device of the Ethernet switch of this invention;

FIG. 4 illustrates the format of each index in the routing table of the Ethernet switch of this invention;

DETAILED DESCRIPTION OF THE INVENTION

Figure 1:
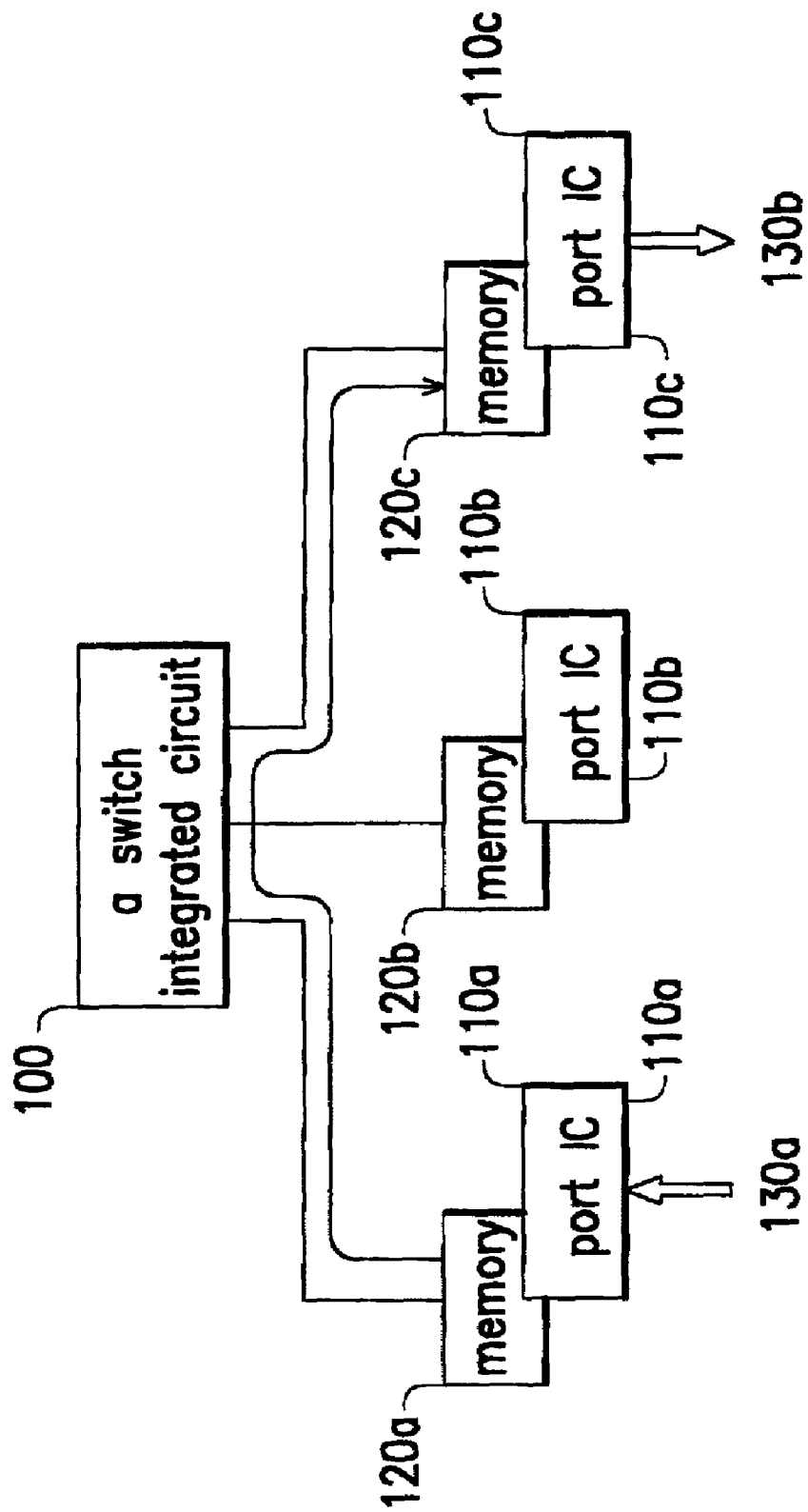
FIG. 1 is a block diagram illustrating the circuit of a conventional Ethernet switch with discrete memory framework.

To realize the above and other objects, this invention provides an Ethernet switch, for selectively transporting or filtering network packets. The Ethernet switch of this type comprises plural network ports, a first and a second memory device, a first and a second memory control devices, a switch device, and a memory management device. Network ports are for receiving or delivering network packets. The first memory device saves the source address and associated messages of the network packets. The second memory device saves the network packets received from the network port. The first and the second memory control devices connect to the first and the second memory devices, respectively, for controlling the read and write of the first and the second memory devices. Besides, the switch device connects the network port and the first memory control device, for creating a source address and the associated messages of the network port for each network packet, and for creating a destination address and the associated messages of the network port for each network packet in accordance with the contents of the first memory device for managing the contents of the first memory device. The second memory device connects the network port and the second memory control device for managing the contents of the second memory control device for managing the contents of the second memory device. The shared memory access control circuit controls the access to the shared memory device. An embodiment of this invention is specified in detail with reference to the drawing as follows.

Figure 2:
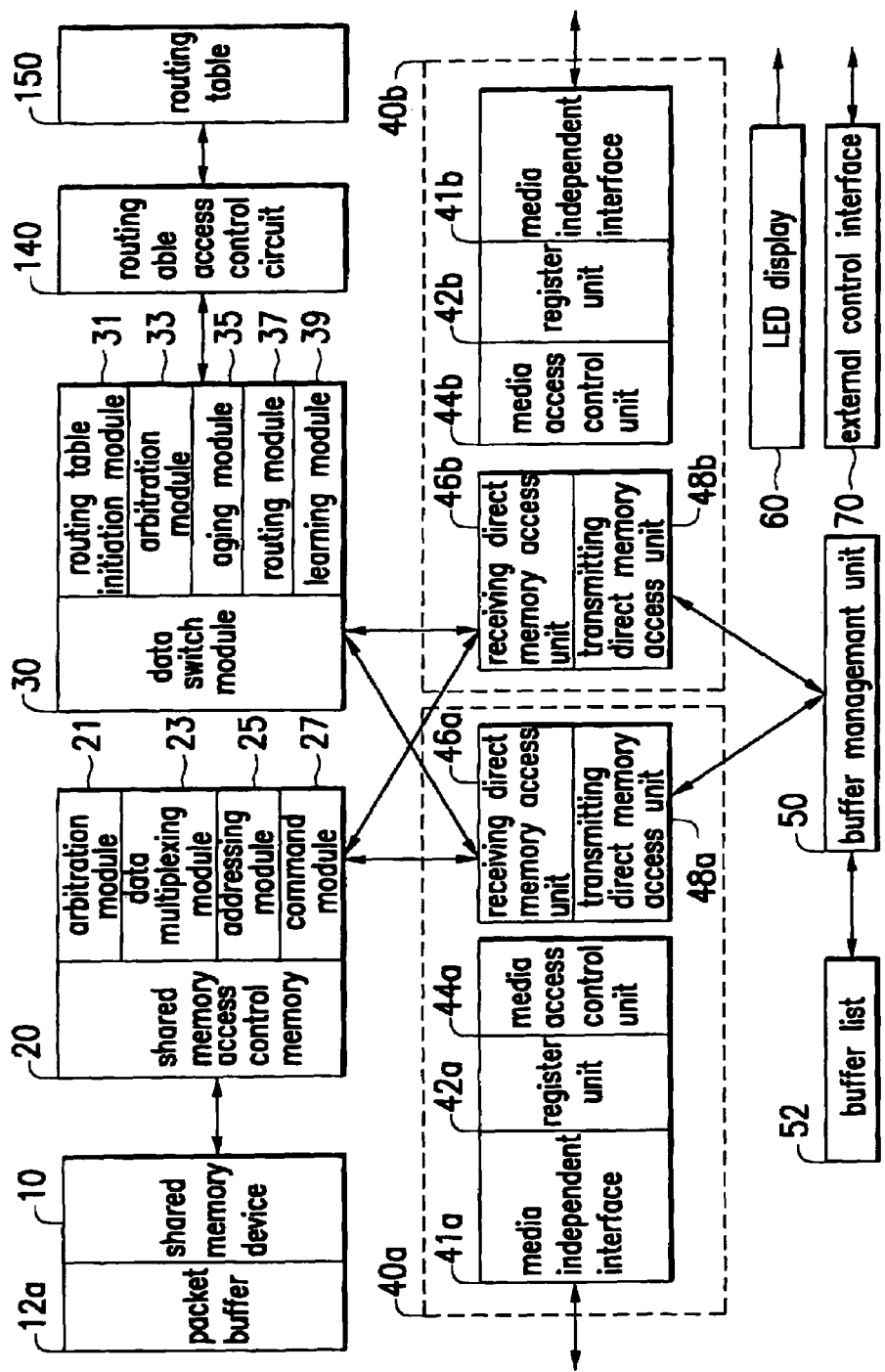
FIG. 2 is a block diagram illustrating the circuit of the Ethernet switch of this invention.

Refer to FIG. 2, a block diagram illustrating the circuit of the Ethernet switch of this invention.

In FIG. 2, an Ethernet switch connecting two LANs comprises: a shared memory device 10, a shared memory access control circuit 20, a data switch module 30, a buffer management unit 50, a buffer table 52, a light emission diode (LED) display 60, an external control interface 70, a routing table 150, and a routing table access control circuit 140, and two data ports 40a and 40b. Each of the data ports 40a and 40b comprises: media independent interfaces 41a and 41b, register units 42a and 42b, media access control units 48a and 48b.

[Shared Memory Device 10]

As shown in FIG. 2, the memory device 10 basically serves as the packet buffer 12a. FIG. 3 is a diagram illustrating the memory device 10. In this embodiment, the size of the memory device 10 is 256K words, in units of 1.5K bytes and divided into 341 buffer units. The memory device 10 serves as the packet buffer 12a and is accessible to the data ports 40a and 40b.

[Routing Table 150]

FIG. 4 illustrates the format of each index in the routing table 150. Each index takes up four characters in the routing table 150, where the first word comprises a 12-bit ID pattern, a 2-bit age flag (ageflg), a one-bit data port number (pno), and a one-bit address flag (fig). The second word is the first to $16^{th}$ bit of the manufacturer's ID code. The third word is the $17^{th}$ to the $24^{th}$ bit of the manufacturer's ID code and a 8-bit age index. The fourth word is reserved.

[Shared Memory Access Control Circuit 20]

As shown in FIG. 2, the shared memory access control circuit 20 basically comprises Arbitrating module 21, Data Multiplexing module 23, Addressing module 25, and command module 27, for controlling the access to the shared memory device 10.

[Routing Table Access Control Circuit 140]

As shown in FIG. 2, the routing table access control circuit is responsible for controlling the read and write of the data in the routing table.

[Data Switch Module 30]

As shown in FIG. 2, the data switch module 30 basically comprises five modules: Routing Table Initiation module 31, Arbitrating module 33, Routing Table Aging module 35, Routing module 37, and Learning module 39.

Routing Table Initiation Module 31

The Routing table Initiation module 31 initializes in two ways: resetting with hardware power and resetting with software programs. Hardware reset generally powers off then on, or decreases then increases the voltage at the reset end of the chip. Software reset is performed by virtue of controlling external interface with software programs.

For example, Routing table Initiation Module 31 clears the age flag and age index of all indices as 000H.

Further, Routing table Initiation Module 31 can be interrupted by the external control interface controlled by the software programs.

Figure 5:
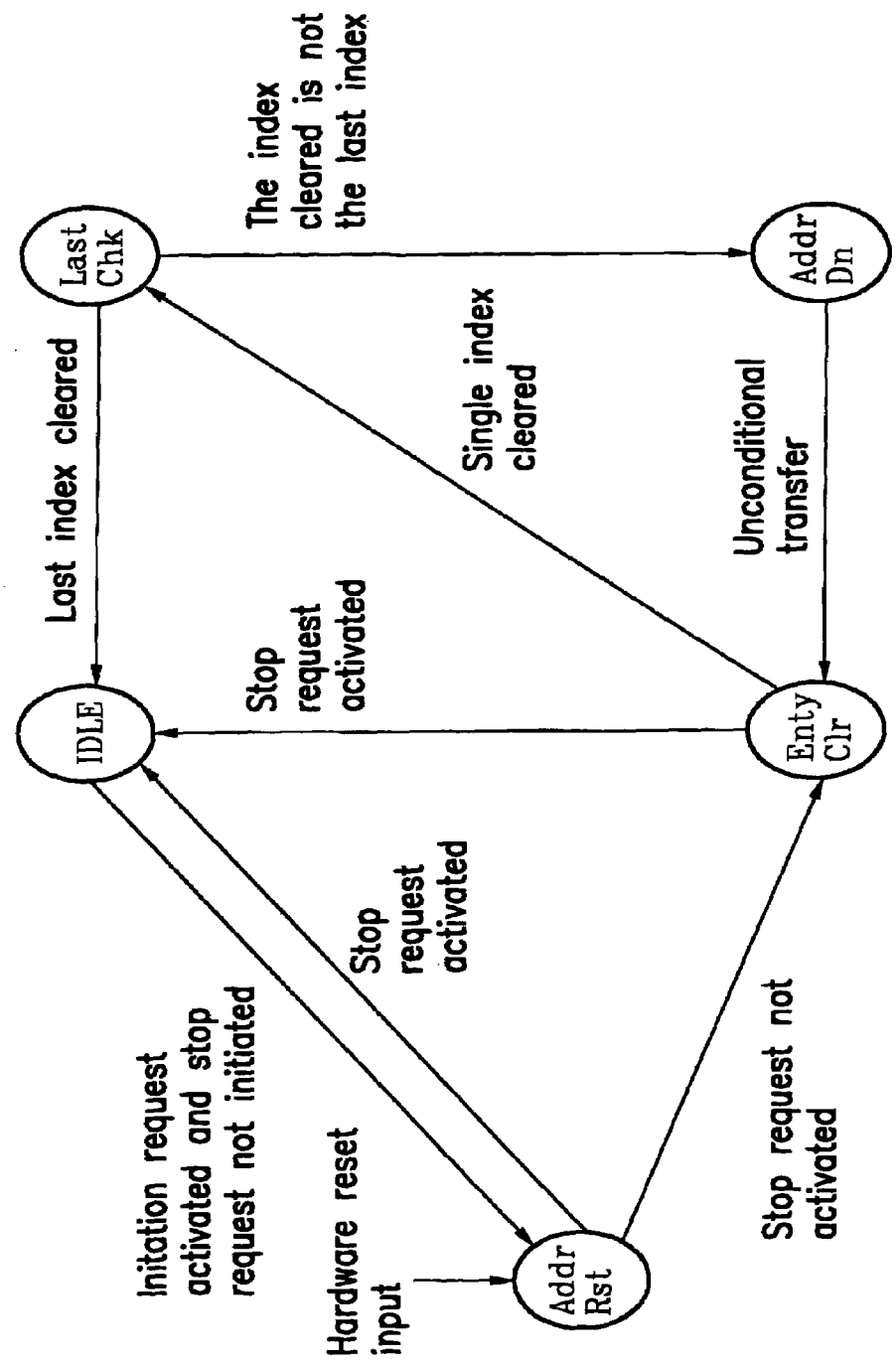
FIG. 5 is a flowchart illustrating the status of the initiation module of the Ethernet switch of this invention.

FIG. 5 is a flowchart illustrating the status of the initiation module 31. As shown in the Figure, there are five states in the routing table initiation module 31: idle IDLE, address reset AddrRst, address index clear EntyClr, last index check LastChk, and address countdown AddrDn.

When the machine is forced to interrupt or the action of the routing table initiation module 31 is completed normally, the routing table initiation module 31 maintains in the idle state; when software control issues a command of controlling the external control interface 70, the routing table initiation module 31 then quits the idle state and enters into the address reset state.

In the address reset state, whether the routing table initiation module 31 is activated by either hardware reset or software, the routing table initiation module 31 first clears the index with the highest address in the routing table 150.

In the address index clear state, the routing table initiation module 31 generates a routing table clear signal for resetting age flag and age index.

In the last index check state, when the index is cleared, said index is checked to determine whether it is the last index on the routing table 150. If yes, then return to idle state; if not, then enter into the address countdown state.

In the address countdown state, the routing table initiation address counter counts down a unit, for continuing the initiation of the index.

Arbitration Module 33

The arbitration module 33 arbitrates the order of route selection and route learning.

Routing Table Aging Module 35

In this embodiment, the life of each index in the routing table 150 should be limited to prevent old data from taking up space in the routing table 150. The routing table aging module periodically ages the age index of each index in the routing table 150.

The action of the routing table aging module 35 is driven by the trigger signal of the routing table timer. The trigger signal has a pulse width of 120 ns. The clock frequency of the routing table counter is determined by the life span. For example, if the life span is set to one, then the routing table 150 will remove each index after aging for one second; if the life span is set to 100, then the routing table 150 will remove each index after aging for 100 seconds.

In the 25 MHz input clock, the 5-bit ripple counter can generate a 781.5 KHz clock. The 781.5 KHz clock serves as the input clock of the 20-bit countdown timer. The initial value of the countdown timer is the same as the life span; when it counts down to zero, a trigger signal is generated. At the same time, the initial value of the life cycle is reloaded for generating the next trigger signal. Furthermore, the initial value of the life cycle can be set by the external control interface 70 with software.

Each time a trigger signal is generated, 4096 indices of the age index in the routing table 150 is counted down to the next unit. If the life span is set to 2, and all indices of the age index are set to 191(BFH), then 4096 indices will age and be cleared in almost 2 seconds.

$$40\ ns \times 32 \times 2 \times 4096 \times 191 = 2.00278016\ seconds$$

Figure 6:
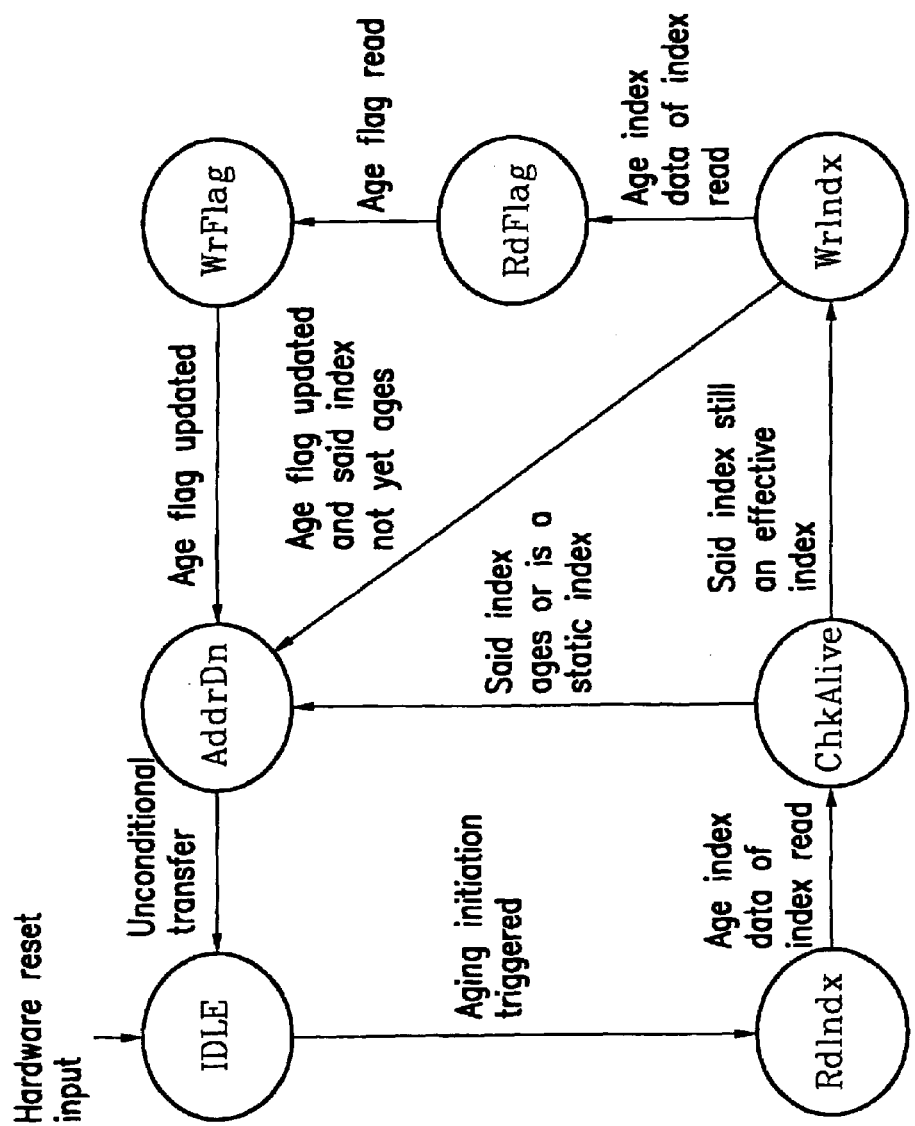
FIG. 6 is a flowchart illustrating the status of the aging module of the Ethernet switch of this invention.

FIG. 6 is a flowchart illustrating the status of the routing table aging module. As shown in the Figure, the routing table aging module 35 has seven states: idle idLE, read age index RdIndx, check age index ChkAlive, age age index WrIndx, address countdown AddrDn, read age flag RdFlag, and write age flag WrFlag.

When aging stops, the routing table aging module 35 maintains in the idle state. When the aging starts or a trigger signal appears, the routing table aging module 35 then quits the idle state and enters into the read age index state.

In the read age index state, the routing table aging module 35 reads the third word in each index of the routing table 150, for obtaining its age index.

After the age index is read, in the check age index state, the attributes of each index in the routing table 150 are checked.

In the degressive age index state, the routing table aging module 35 generates a signal for updating the age index of said index, while the age index counts down to the next unit upon updating.

In the address countdown state, the age address logic circuit will count down the address if the index is accessed.

The age flag represents the attribute of the index. If the attribute of the index survives, then the age flag is 1H. If the attribute of the index aged, then the age flag is 0H. The age flag 2H or 3H indicates that said indices neither aged nor survive. Not all aging processes of each index are required to update the age flag. The routing table aging module 35 will update the age flag only when the age index is counted down from 01H to 00H.

Furthermore, the operation of the data switch module 30 is specified as follows. The operation of the data switch module 30 is basically achieved in accordance with the source address SA and the destination address DA of the network packet and comprises: the routing module 37 and the learning module 39. The learning module 39 is for recording the source address SA and setting the link between the source address SA and the data port. The routing module 37 selects a corresponding data port in accordance with the destination address DA, for outputting said network packet.

Figure 7:
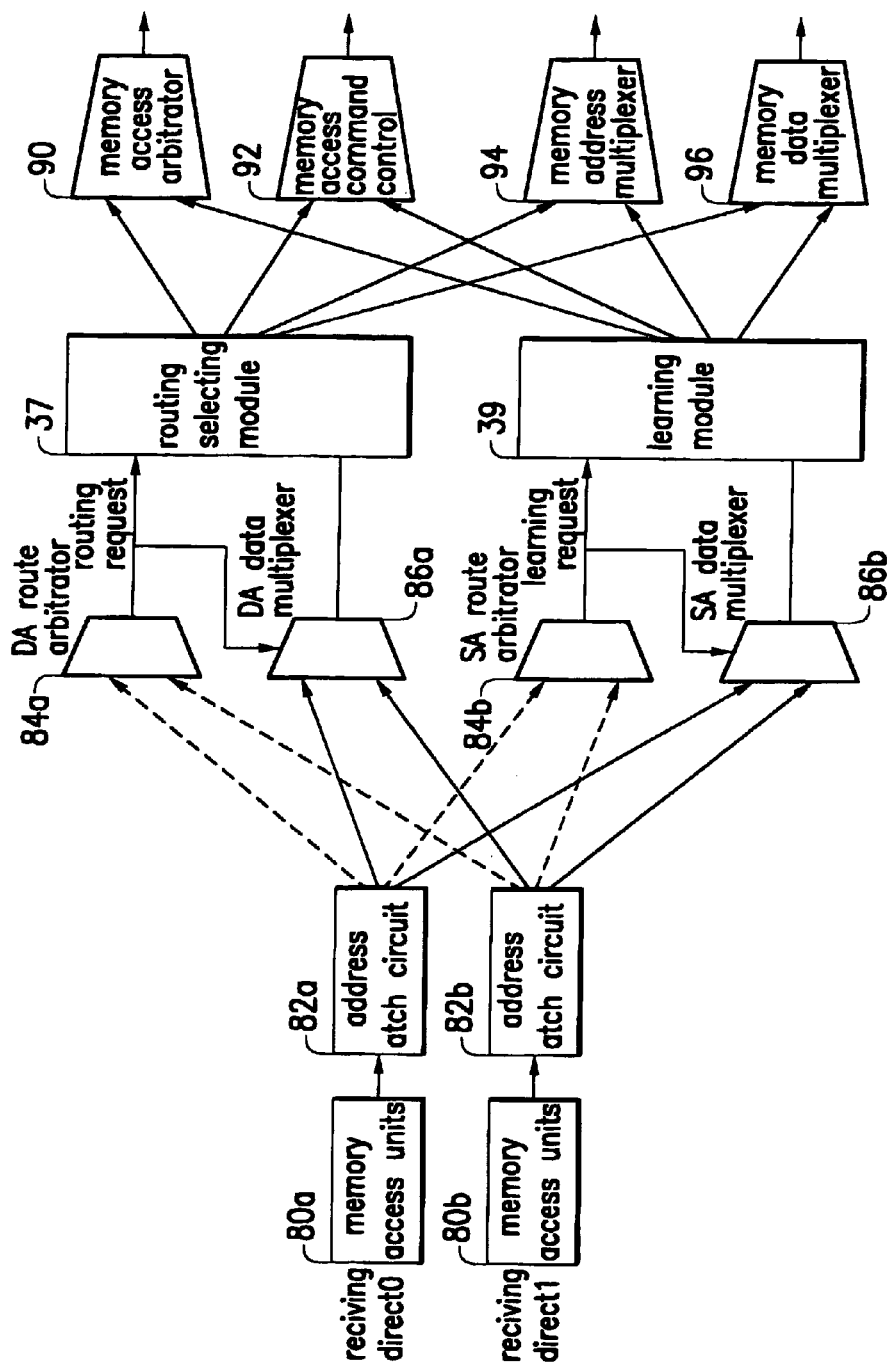
FIG. 7 illustrates the data flow of the destination address and the source address of the Ethernet switch of this invention.

FIG. 7 illustrates the data flow of the destination address DA and the source address SA.

In this embodiment, all network packets are received by the receive-direct memory accesses 80a and 80b. The address latch circuit 82a and 82b DASALatch take out the 48-bit destination address DA and the source address SA from the receive-direct memory accesses 80a and 80b. When the latch circuit 82a and 82b DASALatch take out the 48-bit destination address DA and the source address SA through a DA route arbitrator 84*a*, the DA data multiplexer 86*a* generates a request for route selection and passes through SA route arbitrator 84*b*, and the SA data multiplexer 86*b* generates a learning request for activating the selection module 37 of the destination address DA and the source address of the learning module 39, respectively. The access to the routing table 150 of the route selection module 37 and the learning module 39 is made through the memory access arbitrator 90, memory access command control 92, memory address multiplexer 94 and the memory data multiplexer 96.

Learning Module 39

The learning module 30 of the source address SA performs search and update of the routing table 150. The 48-bit source address has two columns: manufacturer's ID and serial number. The search on routing table 150 is based upon the serial number of the source address SA. The 24-bit serial number is in two parts, for serving a respective index of the routing table. The search flag defines the manner of search of the routing table 150. If the 12 bits of the least significant bits of the 24-bit serial number are referred to search the routing table 150, then the search flag is set to 0. If the 12 bits of the most significant bits of the 24-bit serial number are referred to search the routing table 150, then the search flag is set to 1. To search for an index, three word data will be read, comprising: a 8-bit age index, a 24-bit manufacturer's number, a one-bit network port number, a 1-bit address flag, a two-bit age flag and a 12-bit serial number. The age flag represents the attribute of said index. If the attribute of the index survives, then the age flag is 1H. If the attribute of the index ages, then the age flag is 0H. The age flag 2H or 3H indicates that said indices neither age nor survive. The age index of the surviving index is greater than 00H and smaller than C0H. The age index of the aged index equals 00H.

The number of the characters of the network port number is contingent upon the number of network ports. In this embodiment, the number of the characters of the network port number requires only one bit. If the number of the network ports is 64, then the network number has to be represented in 6 bits.

A matched index must satisfy the following first conditions:

(1) the 24-bit manufacturer's ID code equals the $25^{th}$ to $48^{th}$ bits of the source address (2) the age index does not equal to 00H and is not larger than BFH (3) the age flag equals 1H (4) the network port number equals the network port number for accessing to the corresponding latch circuit of said source address (5) the address flag equals 0

(6) the 12-bit serial number equals the 12 bits of the most significant bits of the 24-bit serial number of the source address (7) the search flag equals 0 or the following second conditions:

(1) the 24-bit manufacturer's ID code equals the $25^{th}$ to $48^{th}$ bits of the source address (2) the age index does not equal to OOH and is not larger than BFH (3) the age flag equals 1H (4) the network port number equals the network port number for accessing to the corresponding latch circuit of said source address (5) the address flag equals 1

(6) the 12-bit serial number equals the 12 bits of the least significant bits of the 24-bit serial number of the source address (7) the search flag equals 1.

First, the learning module 39 uses the 12 bits of the least significant bits of the 24-bit serial number as the first index corresponding to the reference in search of the routing table address. Next, three words of said index are read in accordance with said first conditions and it is determined whether it is a matched index. If yes, the learning module 39 updates the age index to BFH and maintains other data unchanged; otherwise, the learning module 39 searches a second index corresponding to the 12 bits of the most significant bits of the 24-bit serial number in accordance with the source address SA.

Then, as the first index search, three words of the second index are read in accordance with said second conditions and it is determined whether it is a matched index. If yes, the learning module 39 updates the age index to BFH and maintains other data unchanged.

After the two searches, if the learning module 39 still has not found the matched index, the learning module 39 writes the source address data into the index with a smaller index in accordance with the age indices of the first index and the second index.

Figure 8:
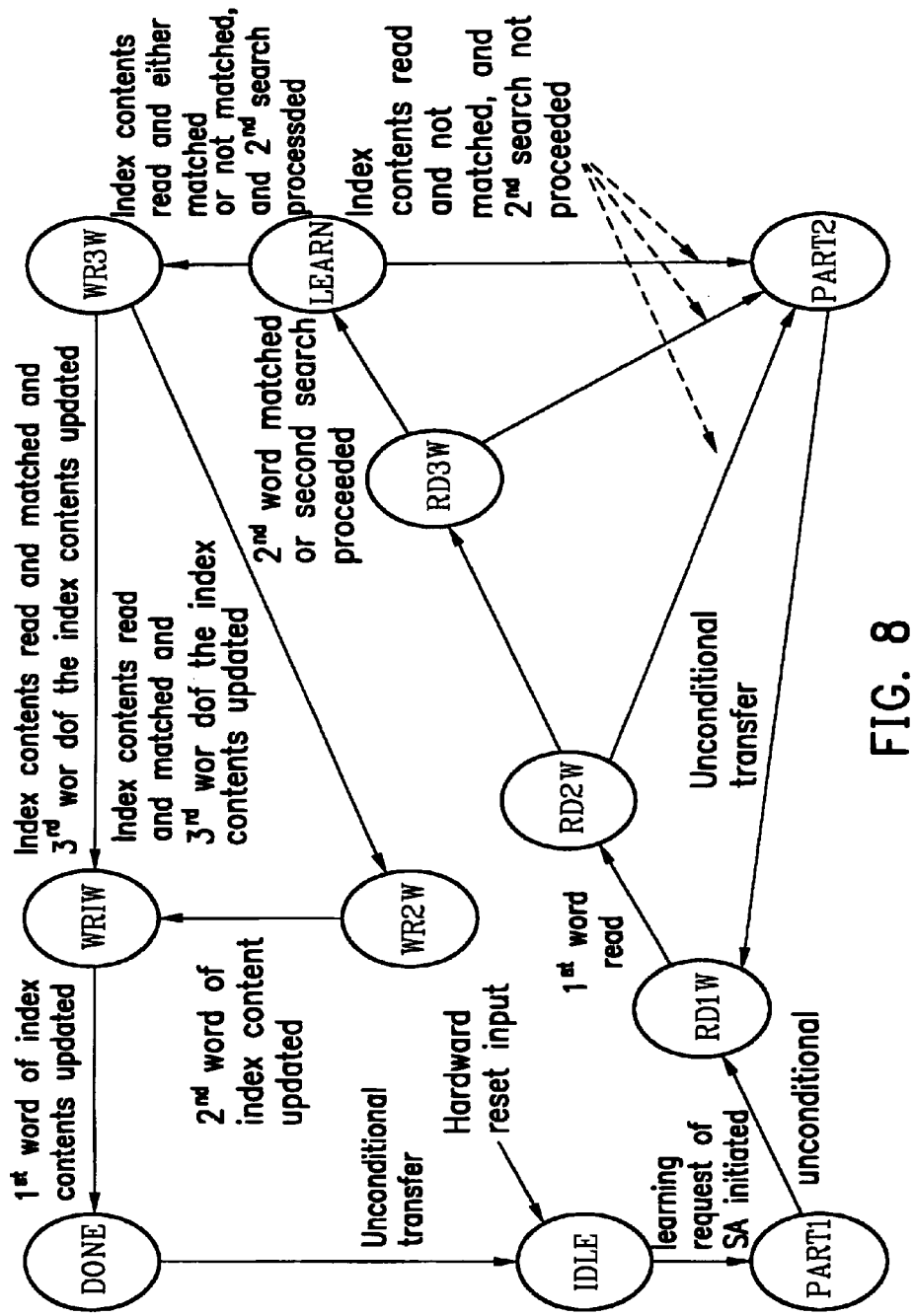
FIG. 8 is a flowchart illustrating the status of the learning module of the Ethernet switch of this invention.

FIG. 8 illustrates the status of the learning module 39. As shown in the Figure, the learning module 39 comprises the following states: idle IDLE, first search PArouting table 1, second search PArouting table 2, read index RD1W, RD2W, and RD3W, learn LEARN, write index WR1W, WR2W, and WR3W, and done DONE.

The learning module remains idle if no learning request incurs.

In the first search state, the learning module 39 sets the search flag to 0, and the 12 bits of the least significant bits of the 24 bit serial number of the source address serves as the search index of the routing table.

In the second search state, the learning module 39 sets the search flag to 1, and the 12 bits of the most significant bits of the 24 bit serial number of the source address serves as the search index of the routing table.

In read index state RD1W, RD2W, and RD3W, the learning module 39 reads the first, the second, and the third words of the search indices, respectively.

In the learning state, the learning module 39 determines whether the search indices are matched indices.

In write index state, the learning module 39 writes the first, the second, and the third words of the selected indices, respectively.

The done state is the state after the learning process is completed.

Route Selecting Module 37

The routing selecting module 37 of the destination address DA only performs the routing table 150 searching. The 48-bit destination address DA has two columns: manufacturer's ID and serial number. The search on routing table 150 is based upon the serial number of the destination address DA. The 24-bit serial number is in two parts, for addressing the destination address DA during the search of the routing table 150. The search flag is for the first routing table searching and the second routing table searching. If the routing selecting module 37 refers to the 12 bits of the least significant bits of the 24-bit serial number in search of the routing table 150, then the search flag is set to 0. If the routing selecting module 37 refers to the 12 bits of the most significant bits of the 24-bit serial number in search of the routing table 150, then the search flag is set to 1. After reading each word, the routing selecting module 37 of the destination address checks whether each word is matched. The first word comprises a one-bit input data port number, a one-bit address flag, a two-bit age flag and a 12-bit serial number. The age flag represents the attribute of said index. If the attribute survives, then the age flag is 1H. If the attribute ages, then the age flag is 0H. The age flags 2H and 3H indicate that said indices neither age nor survive.

For a matched index, the first word must satisfy the following first conditions:

(1) the age flag is 1H
(2) the address flag is 0
(3) the 12-bit serial number equals the 12 bits of the most significant bits of the 24-bit serial number of the destination address
(4) the search flag equals 0 or the following second conditions:
(1) the age flag is 1H
(2) the address flag is 1
(3) the 12-bit serial number equals the 12 bits of the least significant bits of the 24-bit serial number of the destination address
(4) the search flag equals 1.

The second word and third word must be compared as in learning module 39.

(1) the 24-bit manufacturer's ID code equals the $25^{th}$ to $48^{th}$ bits of the source address
(2) the age index does not equal to 00H and is not greater than BFH.

First, the routing module 37 searches for the first index and reads its first word in accordance with the 12 bits of the least significant bits of the 24-bit serial number. Next, it is determined whether said index is matched in accordance with said first conditions. If yes, then take out the network port number from the first word and enter into the done state. If not, the routing module 37 searches for the second index in accordance with the 12 bits of the most significant bits of the 24-bit serial number and determines whether said index is matched in accordance with the said second conditions. If yes, the routing module 37 continues reading the second and the third words of said index and determines whether they are matched. The routing module 37 enters into the done state and resumes the idle state, whether or not the second index is matched.

Figure 9:
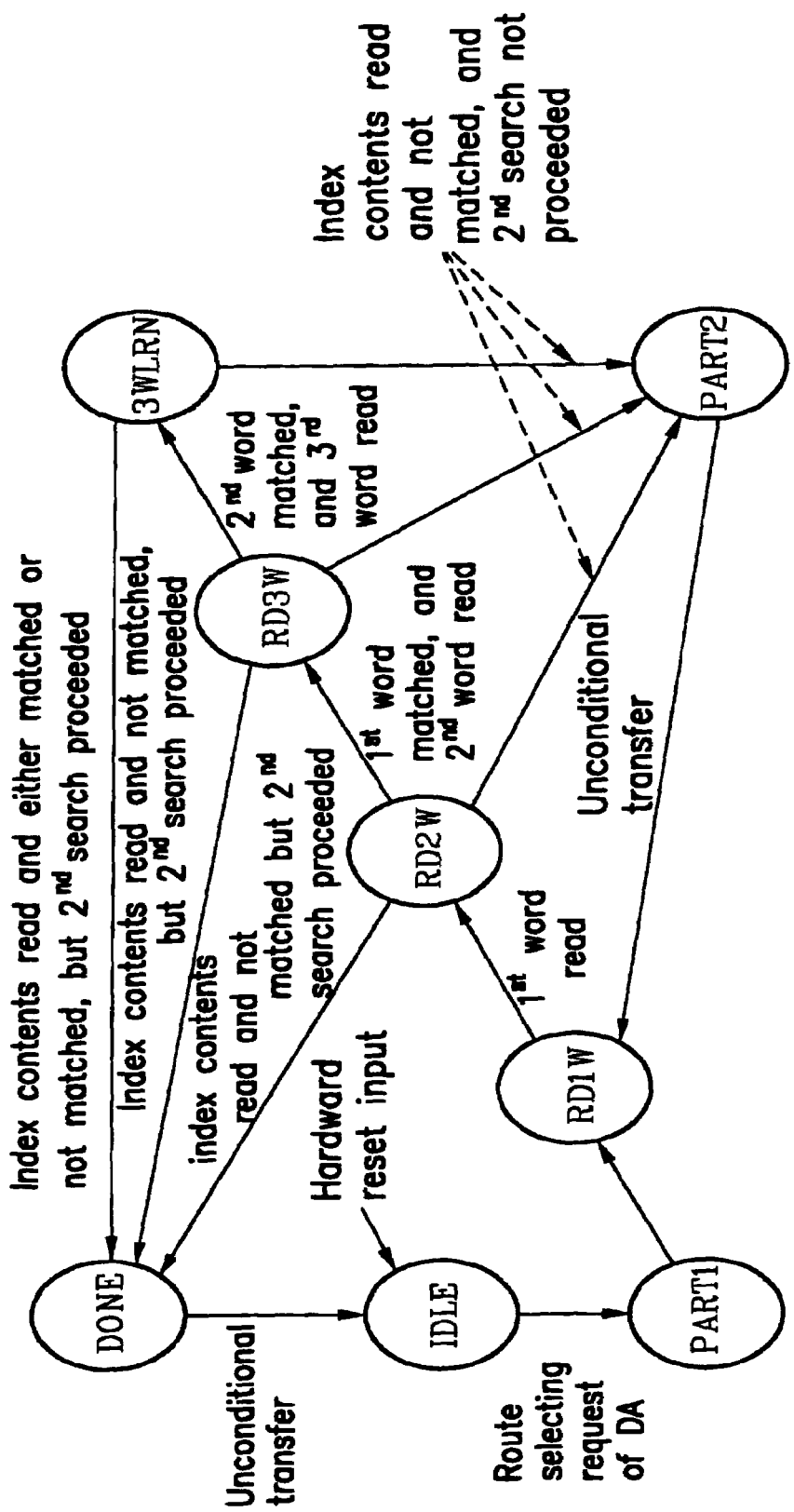
FIG. 9 is a flowchart illustrating the status of the routing module of the Ethernet switch of this invention.

FIG. 9 is a flowchart illustrating the status of the routing selecting module 37. As shown in the Figure, the routing selecting module 37 comprises the following states: idle IDLE, first search PArouting table 1, second search PArouting table 2, read index RD1W, RD2W, and RD3W, learn index 3WLRN, and done DONE.

The routing module 37 remains idle if no routing request incurs.

In the first search state, the routing module 37 sets the search flag to 0, and the 12 bits of the least significant bits of the 24 bit serial number of the destination address serves as the search index of the routing table.

In the second search state, the routing module 37 sets the search flag to 1, and the 12 bits of the most significant bits of the 24 bit serial number of the destination address serves as the search index of the routing table.

In read index state RD1W, RD2W, and RD3W, the routing module 37 reads the first, the second, and the third words of the search indices, respectively.

In the learning state, the learning module 39 determines whether the search indices are matched indices.

In learn index state, the routing module 37 determines whether the first, the second, and the third words of the search indices to be matched, respectively.

The done state is the state after the routing process is completed.

[Network Ports 40a and 40b]

The data ports 40a and 40b can be formed with a media independent interface for linking LANs of various specifications, such as 100BASE and 10BASE LANs.

[Buffer Management Unit 50 and Buffer List 52]

The buffer management unit 50a and buffer list 52 manage the memory device 10. The buffer table 52 records the usage status of the memory device 10 through the data ports 40a and 40b and memory interface control device, while the buffer management unit 50 is coupled to the buffer list 52 and accesses to the network packet buffer 12a of the memory device 10 in accordance with all the recorded status in the buffer list 52.

[Light Emission Diode Display Unit 60]

Light emission diode display unit 60 displays the status of the Ethernet switch.

[External Control Interface 70]

The external control interface receives external control signals.

To summarize, this invention provides a switch and method of switching for an Ethernet, for effectively delivering a network packet among segments. The switch of this invention case be used for linking a 10BASE network system to a 100BASE network system for expanding smoothly from the existing network system to the new network system.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An Ethernet switch comprising:
a plurality of network ports, for receiving or delivering network packets;
a first memory device, for storing the source address and associated messages of said network packets;
a second memory device, for storing the data of the network packets received by the network ports;
a first memory control device, connected to said first memory device, for controlling the read and write of said first memory device;
a second memory control device, connected to said second memory device, for controlling the read and write of said second memory device;
a switch device, connected to said plurality of network ports and said first memory control device, for creating a source address and associated messages of said network ports, creating a destination address and associated messages of said network ports for said network packets in accordance with the contents of said first memory device, and managing the contents of said first memory device; and
a memory management device, connected to said plurality of network ports and said second memory control device, for managing the contents of said second memory device.

2. The Ethernet switch of claim 1, wherein said network ports comprise a first network port and a second network port.

3. The Ethernet switch of claim 1, wherein said network ports comprise media independent interfaces, for connecting to local area networks (LAN) of various specifications.

4. The Ethernet switch of claim 1, wherein said first network port and said second network port comprise media independent interfaces, for connecting to local area network (LAN) of various specifications.

5. The Ethernet switch of claim 1, wherein said switch device comprises an initiation module, for resetting the contents of said first memory device.

6. The Ethernet switch of claim 1, wherein said switch device comprises an aging module, for attenuating the expiry of the contents of said first memory device.

7. The Ethernet switch of claim 1, wherein said switch device comprises:
- a packet switch routing learning module and a packet switch routing selecting module;
- wherein, said packet switch routing learning module searches for the contents of said first memory device in accordance with the source address of said network packets, for creating or updating an index for recording the source addresses of said network packets and their links with said plurality of network ports; and
- said packet switch routing selecting module searches for the contents of said first memory device in accordance with the destination addresses of said network packets, for obtaining said corresponding network ports, and for transporting or filtering said network packets.

8. The Ethernet switch of claim 1, wherein said switch device comprises packet switch processing arbitrating module, for arbitrating the network packet switch processing order of said network packets received from said plurality of network ports.

9. A method of switching network packet for the Ethernet switch, with a plurality of network ports comprising:
- providing a routing table made up of plural indices, for recording the source address of said network packet and the messages associated with said network ports;
- providing a route leaning device, responding to the source address of said packet and the content of said routing table, for creating a new index of said routing table or updating an index of said routing table;
- providing a route selecting device, responding to the destination address of said network packet and the content of said routing table, for determining the link between the destination of said packet and said network port; and
- providing an arbitrating device for arbitrating route learning and selection processing order for said packet received from said plurality of network ports.

10. The method of switching packet for the Ethernet switch of claim 9, further comprising:
- providing a route resetting device, for resetting the content of said routing table.

11. The method of switching packet for the Ethernet switch of claim 9, further comprising:
- providing a routing table index expiry attenuating device, for attenuating the content of said routing table.

12. The method of switching packet for the Ethernet switch of claim 9, further comprising:
- providing an age index, a source port number, an address flag, and an ID pattern in said index.

13. The method of switching packet for the Ethernet switch of claim 9, wherein said route learning device performs the following steps upon creating an index of said routing table or updating an index of said routing table:
- a) set a address flag as the first address flag, set a search index address as the first index address, set an ID pattern as the first ID pattern, set the source network port as the first network port, and set an effective age index range as the first age index range;
- b) read said index in accordance with the first index address on said routing table;
- c) compare the age index of said index to determine whether it is within the range of the first age index;
- d) compare the source network port number, address flag, and ID pattern of said index, to determine whether they are identical to the fast network port, the first address flag, and the first ID pattern; and
- e) determine the source port number of said index and its relation with the source address of said network packet, in response to the outcomes of steps (c) and (d).

14. The method of switching packet for the Ethernet switch of claim 9, wherein said route selecting device performs the following steps upon determining the link between the destination of said packet and said network port:
- a) set a address flag as the second address flag, set a search index address as the second index address, set an ID pattern as the second ID pattern, set the source network port as the second network port and set an effective age index range as the second age index range;
- b) read said index in accordance with the second index address on said routing table;
- c) compare the age index of said index to determine whether it is within the range of the second age index;
- d) compare the source network port number, address flag, and ID pattern of said index, to determine whether they are identical to the second network port, the second address flag, and the second ID pattern; and
- e) determine the source port number of said index and its relation with the destination address of said network pattern, in response to the outcomes of steps (c) and (d).

* * * * *